US 6,609,508 B2

(12) United States Patent
Sexton

(10) Patent No.: US 6,609,508 B2
(45) Date of Patent: Aug. 26, 2003

(54) RELEASABLE RETAINING CLIP FOR IGNITION COIL ASSEMBLY

(75) Inventor: Todd Christopher Sexton, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/035,708

(22) Filed: Jan. 4, 2002

(65) Prior Publication Data

US 2003/0127080 A1 Jul. 10, 2003

(51) Int. Cl.$^7$ ................................. F02P 13/00
(52) U.S. Cl. .................. 123/634; 123/635; 439/127; 439/130
(58) Field of Search ................. 123/634, 635, 123/470; 336/90; 439/127, 130

(56) References Cited

U.S. PATENT DOCUMENTS

| 5,238,415 | A | * | 8/1993 | Bittner et al. ............... 439/130 |
| 5,479,900 | A | * | 1/1996 | Bodenhausen et al. ..... 123/470 |
| 5,577,921 | A | * | 11/1996 | Philyaw et al. ............. 123/635 |
| 5,618,193 | A | * | 4/1997 | Nakajima et al. ........... 439/127 |
| 5,724,946 | A | * | 3/1998 | Franchitto ................... 123/470 |
| 5,944,002 | A | * | 8/1999 | Tracy et al. ................. 123/635 |
| 6,053,149 | A | * | 4/2000 | Lorraine ..................... 123/470 |
| 6,087,918 | A | | 7/2000 | Henry et al. |
| 6,114,933 | A | | 9/2000 | Widiger et al. |
| 6,178,957 | B1 | | 1/2001 | Widiger et al. |
| 6,193,528 | B1 | * | 2/2001 | Rea et al. .................... 439/127 |
| 6,227,186 | B1 | * | 5/2001 | Seidl et al. .................. 123/634 |
| 6,276,339 | B1 | * | 8/2001 | Shebert et al. .............. 123/470 |
| 6,427,674 | B1 | * | 8/2002 | Wylin ......................... 123/634 |
| 6,481,420 | B1 | * | 11/2002 | Panasuk et al. ............. 123/470 |

FOREIGN PATENT DOCUMENTS

EP    0498132    8/1992

* cited by examiner

*Primary Examiner*—Erick Solis
(74) *Attorney, Agent, or Firm*—MacMillan, Sobanski & Todd, LLC

(57) ABSTRACT

A retaining apparatus for mounting a component in an aperture formed in a mounting surface includes an elongated base member having opposite ends. At least two generally parallel side members each extend from an associated one of said base member ends. Each side member includes a free end. A component having a flange with at least two slots formed therein receives an associated side member in each of the slots. A locking means extends from said side members adjacent said free ends. As the component is inserted in the mounting surface aperture, force is applied to move the free ends of the side members toward each other to permit the locking means to pass through the aperture in the mounting surface. When the force is removed, the locking means and the flange engage opposite sides of the mounting surface to releasably retain the component in the aperture.

12 Claims, 2 Drawing Sheets

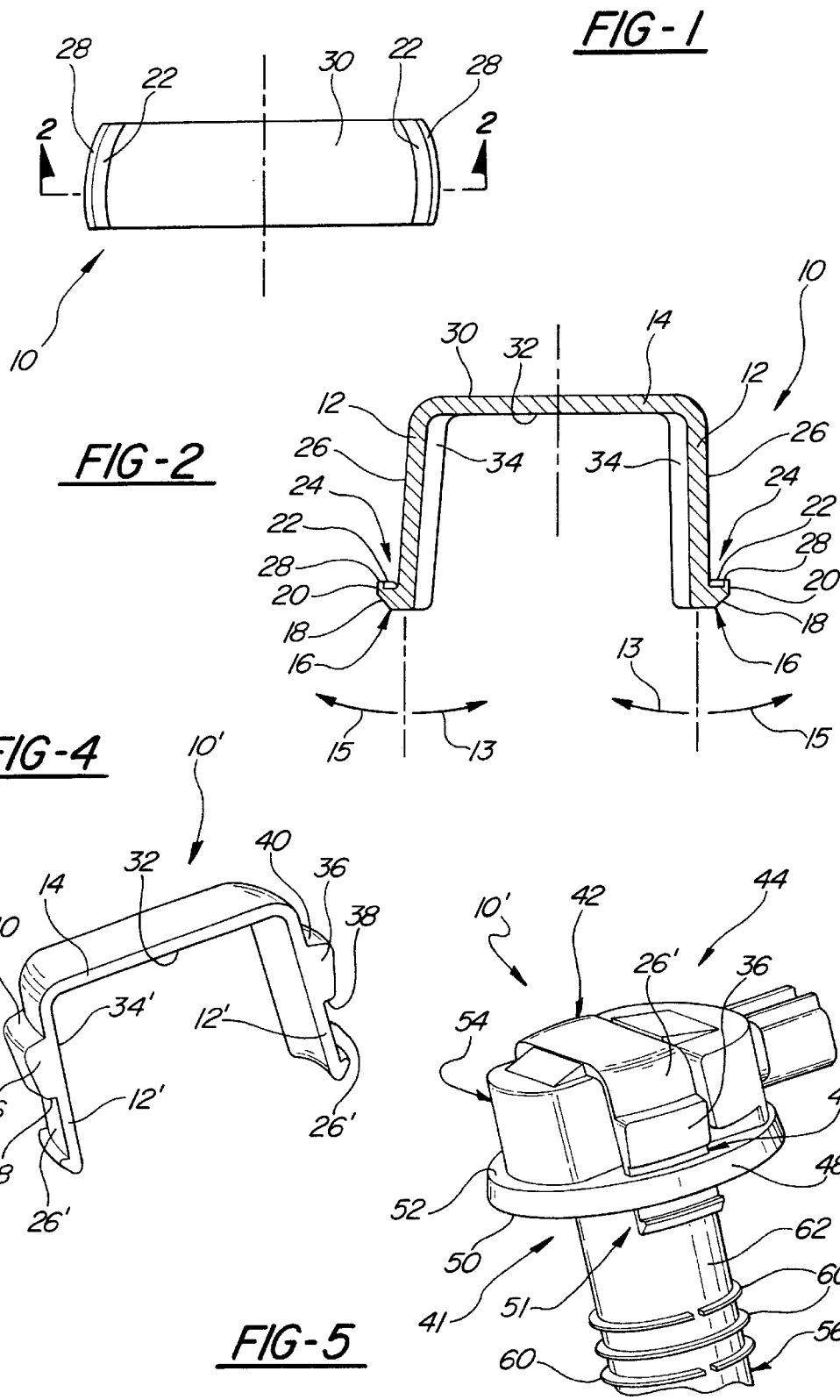

RELEASABLE RETAINING CLIP FOR IGNITION COIL ASSEMBLY

BACKGROUND OF THE INVENTION

The present invention relates generally to automotive ignition coil assemblies and, in particular, to an ignition coil retaining clip for use in an automotive engine compartment.

Ignition coil assemblies for automotive spark-ignition internal combustion engines are well known. Spark-ignition internal combustion engines require the use of spark plugs to ignite a fuel-air mixture that has been introduced into the various combustion cylinders of the engine. The spark plugs are typically disposed in threaded holes in the cylinder head. One end of each spark plug includes gapped electrodes and extends into the combustion cylinder. An opposite end of each spark plug includes an electrical terminal and extends outwardly from the cylinder head.

In order to generate a spark across the gapped electrodes, each spark plug requires a supply of electricity that is provided by an ignition system. Traditionally a single ignition coil was used connected to the spark plugs by a distributor. More recently, an ignition coil assembly, provided for each spark plug, is a component of the ignition system and includes both a wound primary coil and a wound secondary coil. The secondary coil of each coil assembly is electrically connected to the terminal of each spark plug. At the proper time in the engine operating cycle for firing a particular spark plug, electric current flowing through the primary of the respective ignition coil assembly is abruptly interrupted to induce a voltage in the secondary coil sufficiently high to create a spark across the gapped electrodes of the spark plug, igniting the combustible fuel-air mixture to power the engine.

Prior art ignition systems utilize various types of ignition coil assemblies. One type of ignition coil assembly is inserted substantially inside the spark plug insertion bore in the cylinder head combustion engine. This type of coil assembly is known in the art by various names including a pencil coil, a stick coil, a plug hole coil, and a cigar coil. Another type of ignition coil assembly includes a boot that is retained in the engine cover. The magnetic circuit components, including the primary and secondary coils, of this type of ignition coil are housed above the spark plug insertion hole and attached to the boot. This type of coil assembly is known in the art by various names including a coil on plug, plug top coil, and coil per plug.

Regardless of the type of ignition coil assembly, prior art ignition coil assemblies typically have been mounted to a mounting surface in the engine compartment, such as the cam cover or the cylinder head, by an external bracket or mounting arm. A fastener extends through the bracket or mounting arm to fasten the assembly the mounting surface. Many prior art ignition coil assemblies brackets or mounting arms, however, are formed as an integral part of the assembly, disadvantageously limiting the use of the assembly to a single application. If any changes are made to the mounting surface, or if the assembly is desired to be used in a different application, extensive and expensive tooling modification to the assembly is required. Once manufactured, these prior art ignition coil assemblies also require the use of fasteners and occasionally special tools when the assemblies are attached to the mounting surface.

It is desirable to improve on these prior art means for attaching ignition coil assemblies by providing a means for attaching the ignition coil to the engine that is not limited to a single application. It is also desirable to provide a means for attaching the ignition coil to the engine without requiring the use of fasteners or special tools.

It is an object of the invention, therefore, to provide a simple and quick method of attaching ignition coils to a mounting surface within the engine compartment that does not require the use of fasteners or special tools.

SUMMARY OF THE INVENTION

The present invention concerns a retaining clip for attaching a component, preferably an ignition coil assembly, to a mounting surface, such as the cam cover, the cylinder head, or the spark plug, in an internal combustion engine compartment.

The generally U-shaped retaining clip includes a base member having two side members or legs extending transversely from opposite ends. Locking tabs extend outwardly from a lower portion of the exterior surface of each of the side members. The interior surfaces of each of the side members and the base member are shaped to conform to an upper boot portion of the ignition coil assembly.

The boot portion of the ignition coil assembly typically contains the magnetic circuit components and is adapted to receive the retaining clip. An intermediate umbrella portion is attached below the boot portion and includes a sealing surface attached thereto. A lower portion for attaching to the spark plug extends downwardly from the umbrella portion. The ignition coil assembly is typically constructed of metal and overmolded with an elastomeric material, such as liquid silicon rubber material. Apertures in the sealing surface of the umbrella portion receive the lower portion of the side members when the retaining clip is attached to the ignition coil assembly, forming an ignition module. The overmolded silicon rubber material of the sealing surface deflects to receive the lower portion of the side members, forming an interference fit between the walls of the apertures in the sealing surface and the exterior surface of the side members. The lower portion of the side members extends downwardly beyond the sealing surface of the ignition coil.

Apertures in the mounting surface receive the lower portions of the side members that extend downwardly beyond the sealing surface of the ignition coil. The mounting surface is adapted to receive the ignition module and the locking tabs of the side members cooperate with corresponding locking grooves on the mounting surface to hold the module in place on the mounting surface.

During assembly, the installer simply inserts the boot end of the module into the spark plug insertion hole on the engine. The side members on the module coincide with grooves on the mounting surface, advantageously allowing only one possible assembly scenario. Once the module is calibrated to the proper orientation, the installer simply pushes the module into the aperture in the mounting surface. The locking tabs on the module flex inwardly during insertion and then spring back when forced past a specific depth in the apertures and the locking tabs of the side members engage with the locking grooves on the mounting surface.

Once the module is seated, the locking tabs retain the module to the mounting surface, allowing the umbrella portion to apply a constant force against the locking tabs to help keep the module tight on the mounting surface. The high voltage connection with the spark plug can be accomplished by traditional means of a compression spring contact that is fixed to the module. The ignition coil module is preferably removed by squeezing the side members at the top of the module. Alternatively, the ignition coil module is removed by separating the side members at the top of the module. The retaining clip can be made of a variety of different materials including, but not limited to, plastic.

The retaining clip may be attached to the module in a variety of different ways including, but not limited to, an interference fit with the umbrella portion of the ignition coil assembly or overmolding the retaining clip with the same liquid silicon rubber that encapsulates the module. Alternatively, the retaining clip can be molded as part of another piece of the module such as a housing or bobbin.

The present invention advantageously eliminates the need for an external mounting arm configuration of the prior art that requires a bolt type fastener. As a result, there are no extra fasteners or tools needed to install or remove the module, thereby requiring fewer parts to attach the ignition coil assembly to the engine, and reducing the cost of the ignition coil assembly.

The present invention is especially suited for attaching "coil-on-plug" and "pencil" type ignition coils to a mounting surface but may also be adapted for use with other types of ignition coils. Because the present invention eliminates the use of fasteners, the present invention also eliminates the need for a boss or projection extending from prior art mounting surfaces to receive the fastener. As a result, the present invention permits "pencil" type ignition coil assemblies to be virtually hidden in the engine spark plug hole, allowing for a visually appealing low profile design after assembly.

The present invention advantageously reduces the assembly time and the number of parts required to attach the ignition coil assembly to the mounting surface and simplifies the manufacturing, assembly, and attachment processes.

The actual dimensions of the base members and side members may be varied to fit the various profiles of the component that is to be attached to the mounting surface, all while remaining within the scope of the present invention.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a top plan view of a retaining clip in accordance with the present invention;

FIG. 2 is cross-sectional view taken along line 2—2 of in FIG. 1;

FIG. 4 is a perspective view of an alternative embodiment of the retaining clip shown in FIG. 1 in accordance with the present invention; and FIG. 5. is a perspective view of the retaining clip of FIG. 4 shown attached to an ignition coil assembly.

DESCRIPTION OF THE PREFERRED EMBODIMENT

Figure 3:
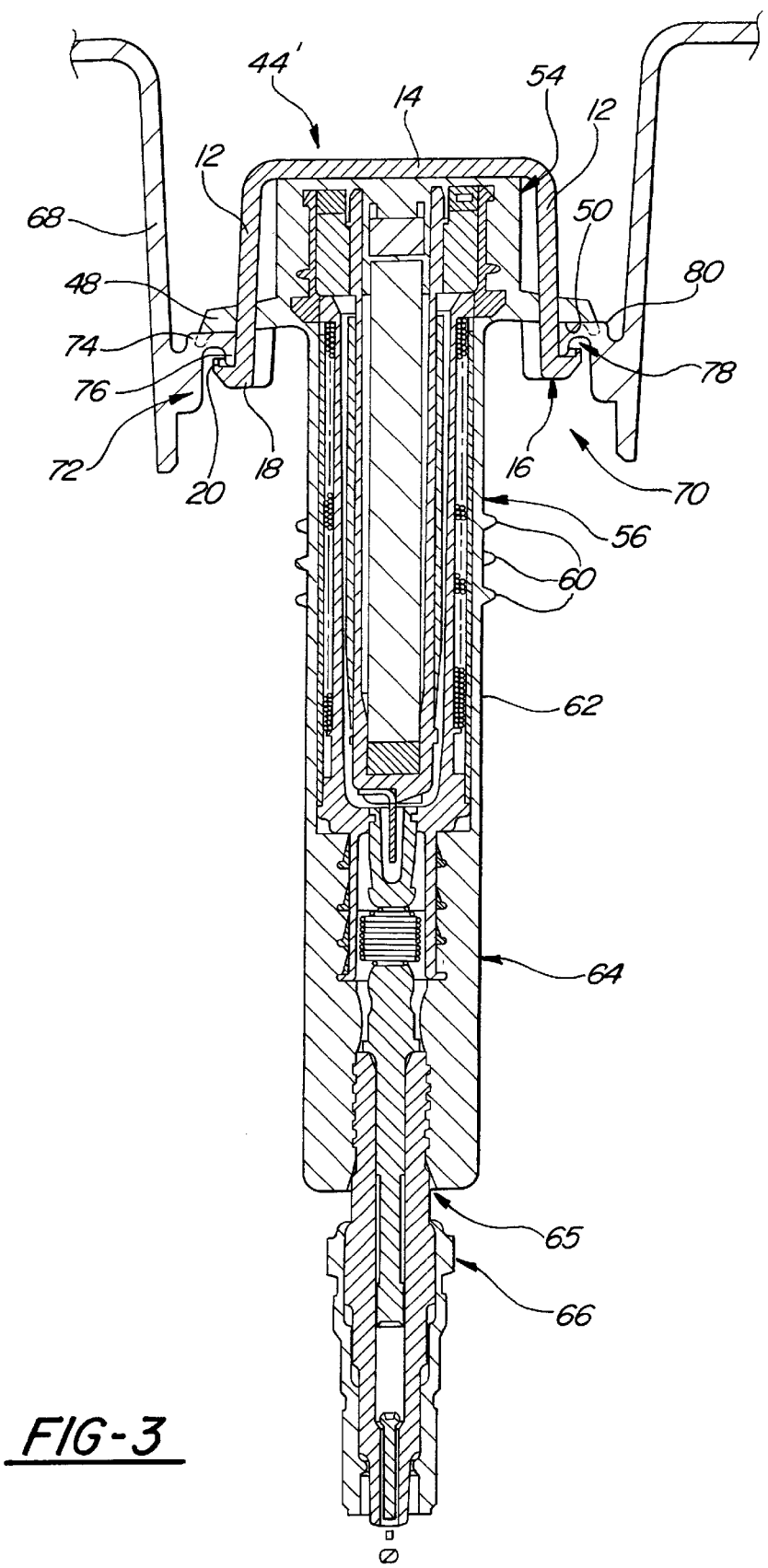
FIG. 3 is a cross-sectional view of the retaining clip of FIG. 1 shown attached to an ignition coil assembly and a mounting surface.

Referring now to FIGS. 1 and 2, a generally U-shaped retaining clip is indicated generally at 10. The retaining clip 10 includes a pair of elongated side members 12 extending downwardly from opposite ends of a base member 14 that includes an upper surface 30 and a lower surface 32. Alternatively, more than two side members 12 extend downwardly from the base member 14. A locking tab 16 having an outwardly extending portion 18 and an upwardly extending portion 20 extends from a lower portion of an exterior surface 26 of a free end of each of the side members 12, forming an upwardly facing mounting surface 22 and defining a mounting recess 24. The upwardly extending portion 20 of the locking tab 16 includes an upper tab surface 28 adjacent and generally parallel to the mounting surface 22. The side members 12 are operable to deflect inwardly, in a direction as indicated by an arrow 13, when a force is applied to the side members 12 for attaching the retaining clip 10 to a component, outlined in more detail below.

Referring now to FIG. 4, an alternative embodiment of the retaining clip is indicated generally at 10'. The generally U-shaped retaining clip 10' includes elongated side members 12' extending downwardly from the base member 14. The side members 12' of the retaining clip 10' include a protrusion 36 extending from an outer surface 26' thereof. The protrusion 36 includes an upper surface 40 and a lower surface 38 that preferably aid in aligning the retaining clip 10' when it is attached to the component, outlined in more detail below.

Referring now to FIG. 5, the retaining clip 10' is adapted to be attached to a component, preferably an ignition coil assembly, indicated generally at 41. The "pencil-type" ignition coil assembly 41 includes an upper boot portion 54 having a groove 42 formed on an exterior surface thereof that cooperates with an interior surface 34' of each of the side members 12' and the interior surface 32 of the base member 14 when the retaining clip 10' is attached to the ignition coil assembly 41. An intermediate umbrella portion 56 having a sealing flange 48 extending therefrom is coupled to the boot portion 54. The ignition coil assembly 41 is preferably constructed of steel and overmolded with an elastomeric material, such as liquid silicon rubber.

A pair of apertures 46 extending through an upper surface 52 and a lower surface 50 of the sealing flange 48 of the umbrella portion 56 receive the lower portion of the free ends of the side members 12' when the retaining clip 10' is attached to the ignition coil assembly 41, the assembled retaining clip 10' and ignition coil assembly 41 forming an ignition module, indicated generally at 44. Alternatively, the retaining clip 10' can be manufactured with more than two side members 12' and the number of apertures 46 in the sealing flange 48 will correspond to the number of side members 12'. During assembly of the ignition module 41, the overmolded silicon rubber material of the sealing flange 48 deflects to receive the lower portion of the side members 12', forming an interference fit between the walls of the apertures 46 in the sealing flange 48 and the side members 12'. The lower portion of the side members 12' extends downwardly below the lower surface 50 of the sealing flange 48 of the umbrella portion 56, forming a space 51 between the lower surface 50 of the sealing flange 48 and the upper surface 28 of the upwardly extending portion 20 of the locking tabs 16. The retaining clip 10' may be removed from the ignition module 41 by applying a force to deflect the side members 12 in the inward direction 13 and a force in an upward direction in order to allow the locking tabs 16 to clear the apertures 46.

Referring now to FIG. 3, a mounting surface 68, such as a cam cover or engine block, includes an aperture 70, such as a spark plug insertion hole, formed therein. An ignition module, shown generally at 44', includes the retaining clip 10 mounted on the ignition coil assembly 41. The aperture 70 is adapted to receive the corresponding ignition module 44'. The mounting surface 68 includes a locking member 72 having a downwardly extending portion 76 extending from an outwardly extending portion 74, defining a locking groove 78 therein. The locking member 72 cooperates with the locking tab 16 of the retaining clip 10.

The umbrella portion 56 includes a plurality of ribs 60 extending outwardly from an exterior surface 62 thereof for sealing an interior surface (not shown) of the spark plug hole. A lower spark plug portion 64 extends downwardly from the umbrella portion 56 of the ignition module 44'. The spark plug portion 64 includes a bore 65 formed therein for receiving a spark plug 66. The spark plug 66 preferably extends into a combustion chamber (not shown) of an internal combustion engine (not shown).

The side members 12 of the module 44' flex in an inward direction 13 during insertion and then spring back in a outward direction as indicated by an arrow 15, best seen in FIG. 1, when forced past a specific depth in the aperture 70, allowing the locking tabs 16 of the side members 12 to engage with the locking members 72 on the mounting surface 68. The module 44' may be removed from the mounting surface by applying a force to deflect the side members 12 in an inward direction 13 in order to disengage the locking tabs 16 from the locking members 72 to allow the module 44' to be removed from the aperture 70.

When the ignition module 44' is attached to the mounting surface 68, the locking tabs 16 of the side members 12 cooperate with the locking members 72 on the mounting surface 68 to hold the ignition module 44' in place on the mounting surface 68. The force required to insert the ignition module 44' into the aperture 70 compresses the rubber material of the sealing flange 48, ensuring a tight sealing interface between the lower surface 50 of the sealing flange 48 and an upper surface 80 of the mounting surface 68.

Although the side members 12 of the retaining clip 10 are shown having an arcuate shape, best seen in FIG. 1, to conform with the contours of the "pencil-type" ignition coil assembly 41, the retaining clip 10 may be advantageously shaped to conform to the contours of the exterior surface of other types of ignition coil assemblies (not shown) including, but not limited to, "coil-on-plug" assemblies while remaining within the scope of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the present invention has been described as attaching an ignition coil assembly to a mounting surface, those skilled in the art will appreciate that the present invention could be utilized to attach various types of components to a mounting surface while still remaining within the scope of the invention.

What is claimed is:

1. A retaining apparatus for mounting a component in an aperture formed in a mounting surface, comprising:
    a component having a flange with at least two slots formed therein;
    an elongated base member having opposite ends;
    at least two generally parallel side members each extending from an associated one of said base member ends and having a free end, each of said side members extending through an associated one of said slots; and
    a locking means extending from said side members adjacent said free ends, whereby as said component is inserted in the mounting surface aperture, force is applied to move said free ends of said side members toward each other to permit said locking means to pass through the aperture in the mounting surface and when said force is removed said locking means and said flange engage opposite sides of the mounting surface to releasably retain said component in the aperture.

2. The retaining apparatus according to claim 1 wherein said component is an ignition coil assembly.

3. The retaining apparatus according to claim 2 wherein said ignition coil assembly is a pencil-type ignition coil assembly.

4. The retaining apparatus according to claim 2 wherein said ignition coil assembly is a coil-on-plug ignition coil assembly.

5. The retaining apparatus according to claim 1 wherein said component is an ignition sensor.

6. The retaining apparatus according to claim 1 wherein said locking means is a locking tab extending outwardly and upwardly from an exterior surface of said free ends of said side members.

7. An assembly for attaching an ignition coil assembly to an internal combustion engine comprising:
    a mounting surface on the engine, said mounting surface including an aperture formed therein;
    an ignition coil assembly having a flange with at least two slots formed therein;
    an elongated base member having opposite ends;
    at least two generally parallel side members each extending from an associated one of said base member ends and having a free end, each of said side members extending through an associated one of said slots; and
    a locking means extending from said side members adjacent said free ends, whereby as said ignition coil assembly is inserted in said mounting surface aperture, force is applied to move said free ends of said side members toward each other to permit said locking means to pass through said aperture in said mounting surface and when said force is removed said locking means and said flange engage opposite sides of the mounting surface to releasably retain said ignition coil assembly in the aperture.

8. The assembly according to claim 7 wherein said mounting surface is a cam cover.

9. The assembly according to claim 7 wherein said mounting surface is a cylinder head.

10. The assembly according to claim 7 wherein said ignition coil assembly is a pencil-type ignition coil assembly.

11. The assembly according to claim 7 wherein said ignition coil assembly is a coil-on-plug ignition coil assembly.

12. The assembly according to claim 7 wherein said locking means is a locking tab extending outwardly and upwardly from an exterior surface of said free ends of said side members.

* * * * *